United States Patent [19]

Colvin

[11] Patent Number: 4,608,887
[45] Date of Patent: Sep. 2, 1986

[54] ADJUSTABLE SOCKET INCLUDING ROTATABLE ADJUSTER

[76] Inventor: David S. Colvin, 23933 Haynes, Farmington Hills, Mich. 48018

[21] Appl. No.: 718,217

[22] Filed: Apr. 1, 1985

[51] Int. Cl.⁴ .................................................. B25B 13/18
[52] U.S. Cl. ............................................ 81/128; 279/64
[58] Field of Search ...................... 81/128; 279/59, 64

[56] References Cited

U.S. PATENT DOCUMENTS

| | | | |
|---|---|---|---|
| 876,244 | 1/1908 | Shigon | 279/64 |
| 885,926 | 4/1908 | Horst | 279/64 |
| 1,498,040 | 6/1924 | Johnson . | |
| 1,554,963 | 9/1925 | Fisher . | |
| 2,580,247 | 12/1951 | Secondi et al. . | |
| 2,582,444 | 1/1952 | Lueht . | |
| 2,669,896 | 2/1954 | Clough . | |
| 2,701,489 | 2/1955 | Osborn . | |
| 2,850,931 | 9/1958 | Conway . | |
| 2,884,826 | 5/1959 | Bruhn . | |
| 3,102,732 | 9/1963 | Livermout . | |
| 3,724,299 | 4/1973 | Nelson . | |
| 4,213,355 | 7/1980 | Colvin . | |
| 4,366,732 | 1/1983 | Schliep | 81/128 |
| 4,366,733 | 1/1983 | Colvin . | |
| 4,378,714 | 4/1983 | Colvin . | |

FOREIGN PATENT DOCUMENTS

| | | | |
|---|---|---|---|
| 50357 | 9/1918 | Sweden . | |
| 619826 | 3/1949 | United Kingdom | 81/128 |

*Primary Examiner*—James G. Smith
*Attorney, Agent, or Firm*—Brooks & Kushman

[57] ABSTRACT

An adjustable socket (10) is disclosed as including a driver (16) having inclined slideways (18) on which jaws (20) are mounted for inward and outward adjusting movement by an adjuster (24) supported on the driver and having an annular flange (26) that projects into jaw slots (22). The adjuster (24) preferably has a two piece construction including a jaw operating member (32) on which the annular flange (26) is provided, a rotatable adjusting member (34) supported on the driver for rotational adjustment, and a press fit connection (36) that secures the jaw operating member (32) to the adjusting member (34) upon assembly. A shoulder (44) on one of the members (32, 34), preferably on the adjusting member (34), axially engages the other member to prevent movement therebetween as the adjustable socket is loaded. The jaw slots (22) and the annular flange (26) preferably extend radially without any axial component to prevent binding during adjustment and use. Both the jaws (20) and the slideways (18) that mount the jaws on the driver (16) have round shapes along the inclined directions of the jaw movement, and the jaws (20) have inwardly facing flat gripping surfaces (66) whose orientation is maintained by the slidable engagement of the annular flange (26) within the jaw slots (22).

19 Claims, 9 Drawing Figures

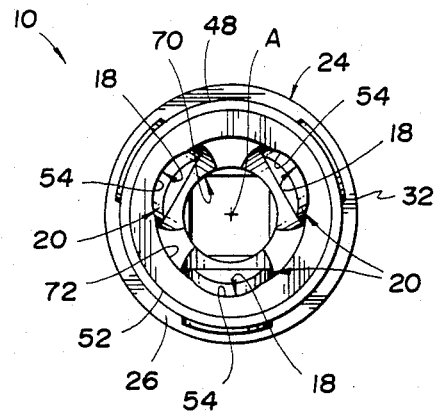
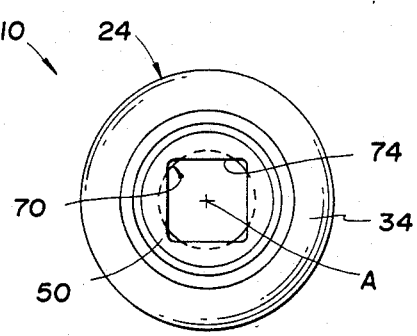
Fig. 4       Fig. 5
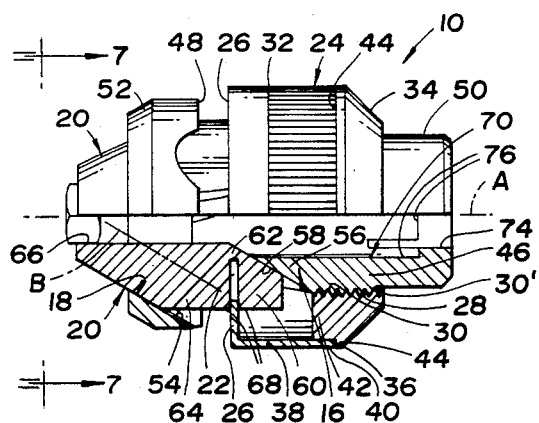
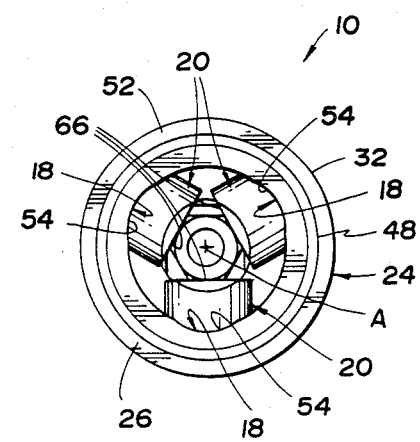
Fig. 6       Fig. 7
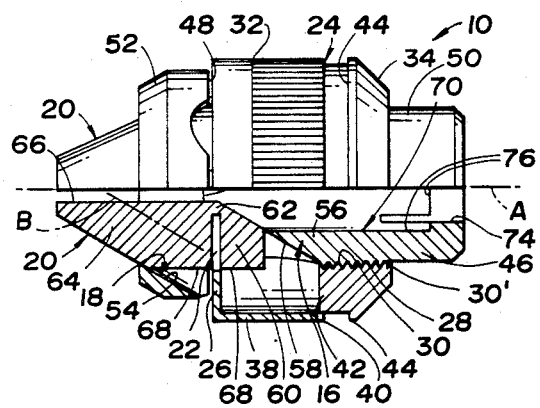
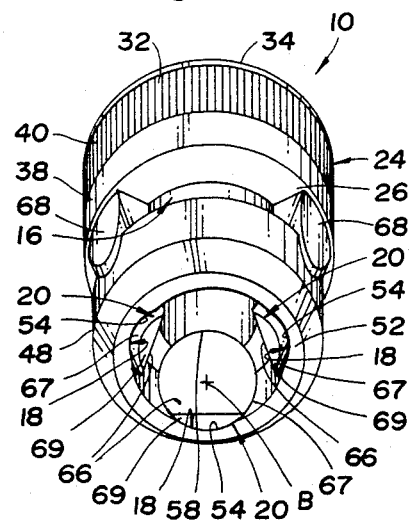
Fig. 8       Fig. 9

ADJUSTABLE SOCKET INCLUDING ROTATABLE ADJUSTER

TECHNICAL FIELD

This invention relates to an adjustable socket for driving threaded bolts and nuts of different sizes.

BACKGROUND ART

The prior art discloses adjustable sockets for replacing the more conventional socket set which includes a number of different size sockets for driving bolts and nuts of different sizes. Usually such adjustable sockets are driven by either a ratchet wrench or a unitary wrench having a bent end that is received within a wrench opening. However, it is also possible to have adjustable sockets that are usable with straight wrenches having a handle end like a screwdriver or slidable wrench handles of the type normally used on hand taps.

Adjustable sockets conventionally include a plurality of jaws that are movable in a radial direction to receive and rotatively drive nuts and bolts of different sizes. The number of positions to which the jaws can be adjusted is usually great enough so that both English and metric size nuts and bolts can be driven by the socket upon appropriate adjustment. Thus, a mechanic can work on any particular job with an adjustable socket without having to constantly remove one socket from the wrench and replace it with another socket. The ever-constant search for a socket of a particular size is also eliminated by adjustable sockets.

The U.S. Pat. No. 2,582,444 of Lucht discloses an adjustable socket wherein movable jaws are mounted on a head of the socket for inward and outward movement under the control of a collar that is threaded to the head. Upon collar rotation in one direction, a spring moves the jaws outwardly to permit gripping of nuts or bolts of a larger size. Rotation of the collar in the other direction moves the jaws inwardly by a camming action against the bias of the spring. Thus, the operation of the socket involves the spring in both the opening and closing movements of the jaws.

Swedish Pat. No. 50357 of H. Warme, dated Sept. 28, 1918, discloses an adjustable wrench including two jaws which are movable on a rotatable driver in an angular relationship along the axis of rotation toward and away from each other by a worm type adjuster. Such a wrench is not adaptable to a three jaw construction such as is necessary to provide driving of conventional hexagonal nuts and bolts.

French Pat. No. 930,657 of M. Etienne Chol, dated July 18, 1947, discloses a three jaw adjustable wrench wherein a rotatable adjusting member has three pins each of which extends outwardly in a radial direction to a hole in the associated jaw to move the jaw axially and radially with respect to the rotational axis of the wrench. This type of wrench has not received any significant commercial acceptance, probably due to the fact that the pin and hole type of adjustment involved is not particularly well suited to manufacturing operations nor does such a construction provide an easily usable and effective socket with a length not substantially greater than normal single size sockets. Also, this type of adjustable socket can only be used when low torque application is involved.

The U.S. Pat. Nos. 4,213,355, 4,366,733, and 4,378,714 of Colvin disclose adjustable sockets wherein jaws are mounted on a driver by slideways for inward adjusting movement against a spring bias and for outward adjusting movement under the impetus of the spring bias. This adjusting movement is provided by rotation of an adjuster having a helical locking surface that engages a helical locking surface on the driver to move a sleeve that has camming surfaces engaged with camming surfaces of the jaws. While this type of adjustable socket has received significant commercial acceptance, both the inward and outward adjusting movement involve a spring bias like the Lucht U.S. Pat. No. 2,582,444 described above.

The U.S. Pat. Nos. 1,554,963, of Fisher, 2,850,931, Conway, and 2,884,826, Bruhn, disclose adjustable sockets that utilize pin and slot adjusters for providing adjustment of movable jaws between fully opened and closed positions. Such pin and slot connections require that a locking action be provided for controlling the position of the pin in the associated slot and necessarily increase the complexity of the socket.

Other adjustable sockets and the like are disclosed by U.S. Pat. Nos.: Johnson, 1,498,040; Secondi et al, 2,580,247; Clough, 2,669,896; Osborn, 2,701,489; Livermont, 3,102,732; and Nelson, 3,724,299.

DISCLOSURE OF INVENTION

An object of the present invention is to provide an improved adjustable socket whose opening and closing movement can be performed without the need for any spring bias, which has a construction that is economical to manufacture while still being effective in operation, which is capable of applying relatively heavy torque loads comparable with one piece sockets, and which has a size small enough to make its use practical.

In carrying out the above object, the adjustable socket of the invention includes a driver that is rotatively driven about a central axis and has a plurality of inclined slideways extending with both radial and axial components with respect to the central axis. A plurality of jaws, preferably three in number so as to be usable with conventional hexagonal nuts and bolts, are respectively mounted by the slideways of the driver for inward and outward movement along with concomitant axial movement with respect to the central axis. Each jaw has a slot that opens outwardly away from the central axis about which the driver rotates. An adjuster of the socket includes an annular flange that projects inwardly with respect to the central axis and is slidably received within the jaw slots. Mating helical surfaces support the adjuster on the driver for adjusting rotation that moves the jaws axially and concomitantly inwardly and outwardly for size adjustment.

The construction and cooperation of the driver, jaws, and adjuster permit opening and closing movement of the adjustable socket without involving any spring bias and also permit economical manufacturing while still providing an extended lifetime of effective use.

In the preferred construction of the adjustable socket, the adjuster includes a jaw operating member on which the flange is provided and a rotatable adjusting member supported on the driver for axial movement along the central axis upon rotation thereof with respect to the driver. A connection of the adjuster secures the jaw operating member and the adjusting member upon assembly of the socket and maintains the assembled relationship. Most preferably, the jaw operating member has a sleeve construction including a first end at which the annular flange is located and a second end adjacent the adjusting member. The adjusting member in the most preferred construction has an end that is press fitted into the second end of the jaw operating member to provide the connection between the members. One of the members of the adjuster includes a shoulder that axially engages the other member to prevent axial movement therebetween during use of the socket. As disclosed, the shoulder is provided on the adjusting member and axially engages the second end of the sleeve shaped jaw operating member to prevent axial movement therebetween during use of the socket.

With the preferred construction of the adjustable socket, the slots in the jaws extend radially with respect to the central axis without any axial component. Likewise, the annular flange on the first end of the jaw operating member extends radially in an inward direction with respect to the jaw slots without any axial component. Such a complete radial orientation of the jaw slots and the annular flange provides opening and closing without any binding upon loading of the jaws during use.

In the preferred construction of the adjustable socket, the driver includes an elongated body having a first end on which the jaws are mounted by the slideways and also having a second end on which the adjuster is mounted by the mating helical surfaces which are preferably embodied by threads. The first end of the driver includes an outer support ring located outwardly from the inclined slideways and from the jaws mounted by the slideways for the inward and outward adjusting movement.

The jaws of the adjustable socket and the slideways of the driver have round shapes along the inclined directions of the slideways. Each jaw also has a flat jaw surface facing inwardly toward the central axis about which the adjustable socket is rotated. This orientation of the jaws is maintained by the engagement between the annular flange of the adjuster and the jaw slots. Each jaw additionally has a partially round outer surface that extends about the central axis and is exposed on the side of the annular flange of the adjuster toward the support ring.

The driver of the adjustable socket also preferably includes a central hole extending between its first and second ends. This central hole of the driver has a first enlarged end adjacent the outer support ring of the jaws. A second square end of the central hole provides for rotational driving of the socket during use and has recesses for securing the adjustable socket to an associated wrench by a ball detent. During use, the central hole of the driver receives a bolt shank that extends past a nut being gripped and torqued by the adjustable socket.

The objects, features, and advantages of the present invention are readily apparent from the following detailed description of the best mode for carrying out the invention when taken in connection with the accompanying drawings.

BRIEF DESCRIPTION OF DRAWINGS

FIG. 4 is a jaw end axial view of the adjustable socket taken along the direction of line 4—4 in FIG. 3;

FIG. 5 is a driver end axial view of the adjustable socket taken along the direction of line 5—5 in FIG. 3;

FIG. 6 is a longitudinal half sectional view of the adjustable socket taken in the same direction as FIG. 3 but with the jaws illustrated in an almost fully closed position gripping a nut to be rotatively driven;

FIG. 7 is a jaw end axial view of the adjustable socket and the gripped nut taken along the direction of line 7—7 in FIG. 6;

FIG. 8 is a longitudinal half sectional view of the adjustable socket illustrating the manner in which assembly is performed; and FIG. 9 is a perspective view of the adjustable socket taken along the direction of line 9—9 in FIG. 3.

BEST MODE FOR CARRYING OUT THE INVENTION

Figure 1:
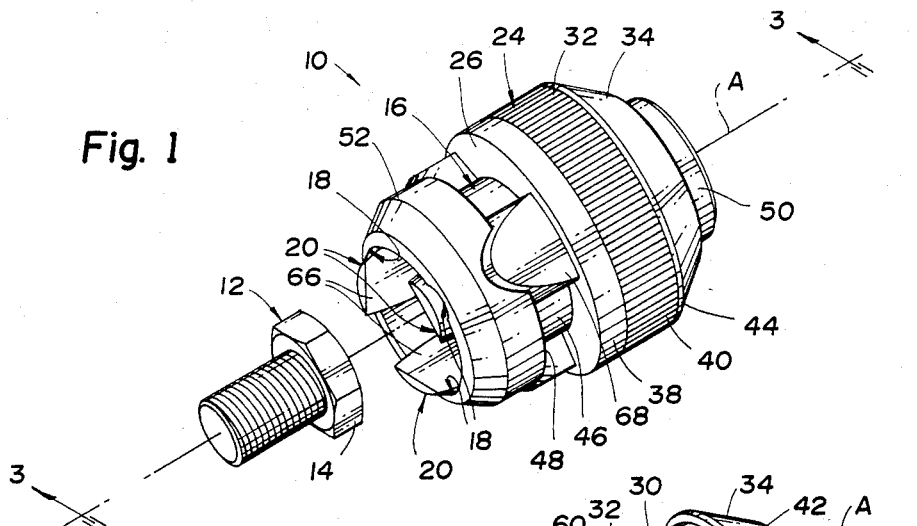
FIG. 1 is a perspective view illustrating an adjustable socket constructed in accordance with the present invention to provide rotational driving such as of the bolt illustrated.

With reference to FIG. 1 of the drawings, an adjustable socket constructed in accordance with the present invention is generally indicated by 10 and is utilized to provide rotational driving of nuts or bolts such as the bolt 12 illustrated with a conventional hexagonal head 14. As is hereinafter more fully described, the adjustable socket 10 is capable of being adjusted to different sizes to grip and rotatively torque nuts and bolts of different sizes. Thus, the adjustable socket 10 can be utilized to rotatively torque and untorque different size nuts and bolts without removal from an associated wrench in the manner necessary with single size sockets.

Figure 2:
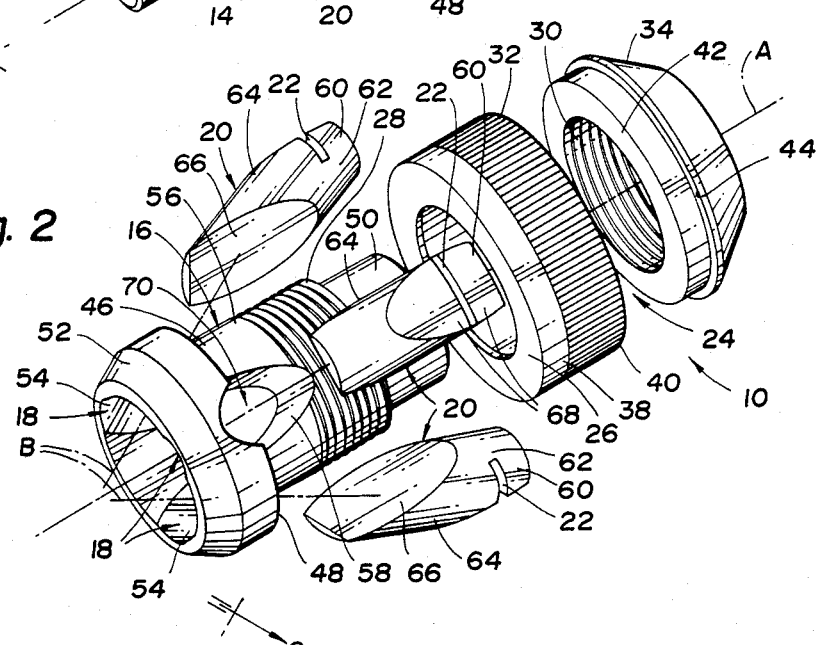
FIG. 2 is an exploded perspective view of the adjustable socket.
Figure 3:
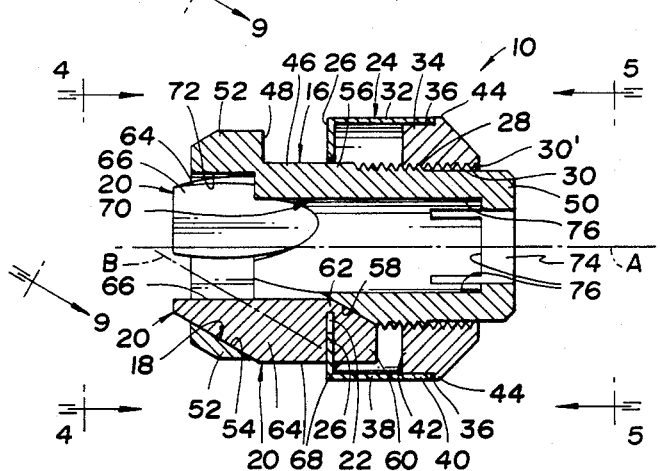
FIG. 3 is a longitudinal sectional view taken through the adjustable socket along the direction of line 3—3 in FIG. 1 with jaws thereof illustrated in a partially open position.

With reference to FIGS. 1, 2, and 3, the adjustable socket 10 includes a driver 16 that is rotatively driven about a central axis A by an associated wrench in a manner which is hereinafter more fully described. This driver 16 includes a plurality of inclined slideways 18 that extend along associated axes B with both radial and axial components with respect to the central axis A. A plurality of jaws 20 are respectively mounted by the slideways 18 of the driver 16 for inward and outward movement with concomitant axial movement with respect to the central axis A. As illustrated, there are three slideways 18 and three associated jaws 20 for providing gripping of alternate surfaces of a conventional hexagonal nut or bolt; however, it should be appreciated that other numbers of jaws can be utilized depending upon the particular type of component to be gripped and torqued. Each jaw 20 has a slot 22 that opens outwardly away from the central axis A. An adjuster 24 of the adjustable socket includes an annular flange 26 that projects inwardly with respect to the central axis A and is slidably received within the jaw slots 22 as best illustrated in FIG. 3. Mating helical surfaces preferably embodied by threads 28 on the driver 16 and threads 30 on the adjuster 24 support the adjuster on the driver for adjusting rotation about the central axis A. Such adjusting rotation slides the annular flange 26 circumferentially in the jaw slots 22 about axis A and moves the jaws 20 axially and concomitantly inwardly and outwardly for size adjustment.

As illustrated best in FIGS. 2 and 3, the adjuster 24 of the adjustable socket includes a jaw operating member 32 on which is provided the annular flange 26 that is received within the jaw slots 22 to provide movement of the jaws upon rotation of the adjuster. Adjuster 24 also includes a rotatable adjusting member 34 on which the adjuster threads 30 are provided for mating with the driver threads 28 to provide axial movement of the adjuster along the central axis A upon adjuster rotation. A connection 36 secures the jaw operating member 32 to the adjusting member 34 upon assembly of the socket as is hereinafter more fully described. Such securement of the jaw operating member 32 to the adjusting member 34 provides the axial movement of the jaw operating member upon rotation of the adjusting member in order to move the jaws axially. As previously mentioned, such axial movement of the jaws results in concomitant inward or outward radial movement of the jaws with respect to the axis A as circumferential sliding as well as inward or outward sliding takes place between the jaw slots 22 and the annular flange 26 of the jaw operating member 32.

With reference to FIG. 3, the jaw operating member 32 has a sleeve construction including a first end 38 at which the annular flange 26 is located and a second end 40 adjacent the rotatable adjusting member 34. An end 42 of the rotatable adjusting member is press fitted into the second end 40 of the jaw operating member 32 to provide the connection 36 between the jaw operating member and the adjusting member. Adjusting member 34 also includes an annular shoulder 44 that axially engages the second end 40 of the jaw operating member 32 to prevent relative axial movement therebetween as the adjustable socket is tightened unto a nut or bolt head and used to apply torque.

With continuing reference to FIG. 3, the slots 22 in the jaws 20 extend radially with respect to the central axis A without any axial component across the entire circumferential extend of each jaw. The annular flange 26 at the first end 38 of the jaw operating member 32 extends radially in an inward direction into the jaw slots 22 without any axial component. This radial orientation of the jaw slots 22 and the annular flange 26 permits the jaw sliding without any binding as the jaws are adjusted to grip and torque a nut or bolt head.

As best illustrated in FIGS. 2 and 3, the driver 16 of the adjustable socket includes an elongated body 46 having a first end 48 on which the jaws 20 are mounted by the slideways 18. Driver body 46 also includes a second end 50 on which the adjuster 24 is mounted by the driver threads 28 that mesh with the threads 30 of the adjusting member 34. At the first driver body end 48, the driver 16 includes an outer support ring 52 located outwardly from the inclined slideways 18 and from the jaws 20 mounted by the slideways for the inward and outward adjusting movement. This jaw support ring 52 includes circumferentially spaced slideway surfaces 54 that define the radial outer extremeties of the jaw slideways 18.

As best illustrated in FIG. 9, the jaws 20 and slideways 18 have round shapes along the inclined directions of the slideways which extend along their associated axes B. An intermediate portion 56 of the driver body is illustrated in FIG. 5 and includes a surface 58 associated with each slideway and cooperating with the associated slideway surface 54 of the support ring 52 to define the round shape of the slideway 18 as illustrated in FIG. 9. Each slideway surface 58 as illustrated in FIG. 2 extends with a somewhat ellipitical shape when viewed in a sideways direction with the pointed end thereof projecting toward the second end 50 of the driver body 46. Adjacent the driver slideway surface 58, each jaw includes an inner end 60 that is hidden from sight and secured by a connecting portion 62 to an outer jaw end 64. At the outer end 64, each jaw 20 includes a flat surface 66 used in the gripping of a nut or bolt head. These jaw surfaces 66 face inwardly in a radial direction toward the central axis A in an orientation that is maintained by the slidable engagement of the annular flange 26 of the rotatable adjuster within the jaw slots 22. In addition to the round jaw surface 67 (FIG. 9) that defines the round jaw shape along the direction of the associated slideway axis B, each jaw 20 also includes a partially round outer surface 68 that extends about the central axis A on both the inner an outer ends 62 and 64 of the jaw. Also, at the outer tips of the jaws, the round jaw surfaces 67 are connected to the flat jaw surface 66 by end surfaces 69.

As illustrated in FIGS. 3, 4, and 5, the driver 16 includes a central hole 70 extending through the body 46 thereof along the central axis A. This central hole 70 has a first enlarged end 72 adjacent the outer support ring 52 for providing support for the jaws 20. The central hole also includes a second square end 74 (FIG. 5) for providing rotational driving of the socket by the tang of an associated wrench. The square hole end 74 includes depressions 76 (FIG. 3) for securing the adjustable socket to an associated wrench by a detent of the wrench. The central hole 70 of the driver receives a bolt shank that extends past a nut being gripped and torqued by the adjustable socket.

Assembly of the adjustable socket described above commences with the components thereof positioned in the relationship illustrated in FIG. 8 where the inner extremity of the annular flange 26 is located just in alignment with the outer end of the jaw slots 22 with the sleeve end 40 of the jaw operating member 32 just slightly fitted over the end 42 of the adjusting member 34. The jaws 20 are then moved toward the right such that the slots 22 thereof receive the annular flange 26 and a press operation is performed to provide the press fit connection 36 where the sleeve end 40 engages the shoulder 46 of the adjusting member 34. Upon opening movement, the outer surfaces 68 of the inner jaw ends 60 engage the inner side of the sleeve end 38 of the jaw operating member 32 to limit opening. Closing movement is limited by the last turn 30' of the adjusting member threads 30 which is deformed to prevent inward movement substantially passed the position of FIG. 6 in order to maintain the inserted relationship of the annular flange 26 within the jaw slots 22 and the resultant assembled condition of the adjustable socket.

While the best mode for carrying out the invention has been described in detail, those familiar with the art to which this invention relates will recognize various alternative embodiments for practicing the invention as defined by the following claims.

What is claimed is:

1. An adjustable socket comprising: a driver that is rotatively driven about a central axis thereof; said driver having a plurality of inclined slideways each of which has inner and outer slideway surfaces extending parallel to each other with both radial and axial components with respect to the central axis; a plurality of jaws each of which has inner and outer parallel jaw surfaces; said jaws being respectively mounted by slidable engagement of the inner and outer parallel surfaces thereof with the inner and outer parallel slideway surfaces of the slideways of the driver for inward and outward movement along with concomitant axial movement with respect to the central axis; each jaw having a slot that opens outwardly away from the central axis; an adjuster including an annular flange that projects inwardly with respect to the central axis and is slidably received within the jaw slots; mating helical surfaces that support the adjuster on the driver for axial adjusting rotation that moves the jaws axially and concomitantly inwardly and outwardly along the inner and outer slideway surfaces for size adjustment between open and closed positions; and the annular flange being located along the axial extent of the slideways of the driver with the jaws in the closed position.

2. An adjustable socket as in claim 1 wherein the adjuster includes:
   a jaw operating member on which the annular flange is provided;
   a rotatable adjusting member supported on the driver for axial movement along the central axis upon rotation thereof; and
   a connection that secures the jaw operating member and the adjusting member upon assembly of the socket.

3. An adjustable socket as in claim 2 wherein the jaw operating member has a sleeve construction including a first end at which the annular flange is located and a second end adjacent the adjusting member, the adjusting member having an end that is press fitted into the second end of the jaw operating member to provide the connection between the members, and one of said members including a shoulder that axially engages the other member to prevent axial movement therebetween during use of the socket.

4. An adjustable socket as in claim 3 wherein the slots in the jaws extend radially with respect to the central axis without any axial component, and the annular flange on the first end of the jaw operating member extending radially in an inward direction into the jaw slots without any axial component.

5. An adjustable socket as in any one of the preceding claims wherein the driver includes an elongated body having a first end on which the jaws are mounted by the slideways and also having a second end on which the adjuster is mounted.

6. An adjustable socket as in claim 5 wherein the first end of the driver includes an outer support ring located outwardly from the inclined slideways and from the jaws mounted by the slideways for the inward and outward adjusting movement.

7. An adjustable socket as in claim 6 wherein the jaws and slideways of the driver have round shapes along the inclined directions of the slideways, and each jaw having a flat jaw surface facing inwardly in a radial direction toward the central axis in an orientation that is maintained by engagement between the annular flange and the jaw slots.

8. An adjustable socket as in claim 7 wherein each jaw also has a partially round outer surface that extends about the central axis.

9. An adjustable socket as in claim 6 wherein the driver includes a central hole extending between the first and second ends thereof, said central hole of the driver having a first enlarged end adjacent the outer support ring for the jaws, and the central hole having a second square end for providing rotational driving of the socket.

10. An adjustable socket comprising: a driver that is rotatively driven about a central axis thereof; said driver having a plurality of inclined slideways extending with both radial and axial components with respect to the central axis; said slideways having round cross sections each of which has inner and outer slideway surfaces extending parallel to each other along the inclined direction thereof; a plurality of jaws respectively mounted by the slideways of the driver for inward and outward movement along with concomitant axial movement with respect to the central axis; each jaw having a round shape received by the associated slideway and including inner and outer parallel jaw surfaces slidably mounted by the associated inner and outer slideway surfaces; each jaw also having a slot that opens outwardly away from the central axis; an adjuster including an annular flange that is slidably received within the jaw slots; mating helical threads that support the adjuster on the driver for axial adjusting rotation that moves the jaws axially and concomitantly inwardly and outwardly along the inner and outer slideway surfaces for size adjustment between open and closed positions; and the annular flange being located along the axial extend of the slideways of the driver with the jaws in the closed position.

11. An adjustable socket comprising: a driver that is rotatively driven about a central axis thereof; said driver having a plurality of inclined slideways each of which has inner and outer slideway surfaces extending parallel to each other with both radial and axial components with respect to the central axis; a plurality of jaws respectively mounted by the slideways of the driver for inward and outward movement along with concomitant axial movement with respect to the central axis; each jaw including inner and outer parallel jaw surfaces slidably mounted by the associated inner and outer slideway surfaces; each jaw also having a slot that opens outwardly away from the central axis in an axial direction without any axial component; an adjuster including an annular flange that projects inwardly with respect to the central axis in a radial direction without any axial component and is slidably received within the jaw slots; mating helical threads that support the adjuster on the driver for axial adjusting rotation that moves the jaws axially and concomitantly inwardly and outwardly along the inner and outer slideway surfaces for size adjustment between open and closed positions; and the annular flange being located along the axial extend of the slideways of the driver with the jaws in the closed position.

12. An adjustable socket comprising: a driver that is rotatively driven about a central axis thereof; said driver having a plurality of inclined slideways each of which has inner and outer slideway surfaces extending parallel to each other with both radial and axial components with respect to the central axis; a plurality of jaws respectively mounted by the slideways of the driver for inward and outward movement along with concomitant axial movement with respect to the central axis; each jaw including inner and outer parallel jaw surfaces slidably mounted by the associated inner and outer slideway surfaces; each jaw also having a slot that opens outwardly; an adjuster including a jaw operating member, a rotatable adjusting member, and a connection that secures the jaw operating member and the adjusting member to maintain the assembled condition of the socket; said jaw operating member including an annular flange that is received within the jaw slots to provide axial jaw movement which results in inward and outward jaw movement along the slideways; mating helical threads that support the adjusting member on the driver for axial adjusting rotation that moves the jaw operating member and the jaws axially to provide the inward and outward jaw movement along the inner and outer slideway surfaces for size adjustment between open and closed positions; and the annular flange being located along the axial extent of the slideways of the driver with the jaws in the closed position.

13. An adjustable socket comprising: a driver that is rotatively driven about a central axis thereof; said driver having a first end including a plurality of inclined slideways extending with both radial and axial components with respect to the central axis; said slideways having round cross sections each of which has inner and outer slideway surfaces extending parallel to each other along the inclined direction thereof; the first end of the driver also having an outer support ring extending around the slideways; the driver also having a second end including a square hole for rotatively driving the socket; a plurality of jaws respectively mounted by the slideways of the driver for inward and outward movement along with concomitant axial movement with respect to the central axis; each jaw having a round shape received by the associated slideway and including inner and outer parallel jaw surfaces slidably mounted by the associated inner and outer slideway surfaces; each jaw also having a slot that opens outwardly away from the central axis in an axial direction without any axial component; each jaw having a flat jaw surface facing inwardly in a radial direction toward the central axis; and adjuster including a jaw operating member, a rotatable adjusting member, and a connection that secures the jaw operating member and the adjusting member to maintain the assembled condition of the socket; said jaw operating member including an annular flange that projects inwardly with respect to the central axis in a radial direction without any axial component and is received within the jaw slots to provide axial jaw movement which results in inward and outward jaw movement along the slideways; mating helical threads that support the adjusting member on the second end of the driver for axial adjusting rotation that moves the jaw operating member and the jaws axially to provide the inward and outward jaw movement along the inner and outer slideway surfaces for size adjustment between open and closed positions; and the annular flange being located along the axial extent of the slideways of the driver with the jaws in the closed position.

14. An adjustable socket comprising: a driver that is rotatively driven about a central axis thereof; said driver having first and second ends and a central hole extending between its ends; said first end of the driver including a plurality of inclined slideways each of which has inner and outer slideway surfaces extending parallel to each other with both radial and axial components with respect to the central axis; said slideways having round cross sections along the inclined directions thereof; the first end of the driver also having an outer support ring extending around the slideways; the cental hole of the driver having a square end at the second driver end to permit rotational driving of the socket; a plurality of jaws respectively mounted by the slideways of the driver for inward and outward movement along with concomitant axial movement with respect to the central axis; each jaw having a round shape received by the associated slideway and including inner and outer parallel jaw surfaces slidably mounted by the associated inner and outer slideway surfaces; each jaw also having a slot that opens outwardly away from the central axis in an axial direction without any axial component; each jaw having a flat jaw surface facing inwardly in a radial direction toward the central axis; an adjuster including a jaw operating member, a rotatable adjusting member, and a connection that secures the jaw operating member and the adjusting member to maintain the assembled condition of the socket; said jaw operating member including an annular flange that projects inwardly with respect to the central axis in a radial direction without any axial component and is received within the jaw slots to provide axial jaw movement which results in inward and outward jaw movement along the slideways; said annular flange cooperating with the jaw slots to maintain the inwardly facing orientation of the flat jaw surfaces; mating helical threads that support the adjusting member on the second end of the driver for axial adjusting rotation that moves the jaw operating member and the jaws axially to provide the inward and outward jaw movement along the inner and outer slideway surfaces for size adjustment between open and closed positions; and the annular flange being located along the axial extend of the slideways of the driver with the jaws in the closed position.

15. An adjustable socket comprising: a driver that is rotatably driven about a central axis thereof; said driver having a plurality of inclined slideways each of which has inner and outer slideway surfaces extending parallel to each other with both radial and axial components with respect to the central axis; said slideways having round shapes along the inclined axes thereof; a plurality of jaws respectively mounted by the slideways of the driver for inward and outward movemnt along with concomitant axial movement with respect to the central axis; each jaw including inner and outer parallel jaw surfaces slidably mounted by the associated inner and outer slideway surfaces; each jaw also having a slot that opens outwardly away from the central axis and also having a flat surface that faces inwardly in a radial direction to grip a nut or bolt head; said jaws having round shapes along the inclined axes of the slideways; an adjuster including an annular flange that projects inwardly with respect to the central axis and is slidably received within the jaw slots; said annular flange cooperating with the jaw slots to maintain the inwardly facing orientation of the flat surfaces of the jaws; mating helical surfaces that support the adjuster on the driver for adjusting rotation that moves the jaws axially and concomitantly inwardly and outwardly along the inner and outer slideway surfaces for size adjustment between open and closed positions; and the annular flange being located along the axial extent of the slideways of the driver throughout jaw movement between the open and closed positions.

16. An adjustable socket comprising: a driver that is rotatively driven about a central axis thereof; said driver having a plurality of inclined slideways each of which has inner and outer slideway surfaces extending parallel to each other with both radial and axial components with respect to the central axis; a plurality of jaws each of which has inner and outer parallel jaw surfaces; said jaws being respectively mounted by slidable engagement of the inner and outer parallel surfaces thereof with the inner and outer parallel slideway surfaces of the slideways of the driver for inward and outward movement along with concomitant axial movement with respect to the central axis; each jaw having a slot that opens outwardly away from the central axis; an adjuster including an annular flange that projects inwardly with respect to the central axis and is slidably received within the jaw slots; mating helical surfaces that support the adjuster on the driver for axial adjusting rotation that moves the jaws axially and concomitantly inwardly and outwardly along the inner and outer slideway surfaces for size adjustment between open and closed positions; and the annular flange being located along the axial extend of the slideways of the driver throughout jaw movement between the open and closed positions.

17. An adjustable socket comprising: a driver that is rotatively driven about a central axis thereof; said driver having a plurality of inclined slideways each of which has inner and outer slideway surfaces extending parallel to each other with both radial and axial components with respect to the central axis; a plurality of jaws each of which has inner and outer parallel jaw surfaces; said jaws being respectively mounted by slidable engagement of the inner and outer parallel surfaces thereof with the inner and outer parallel slideway surfaces of the slideways of the driver for inward and outward movement along with concomitant axial movement with respect to the central axis; each jaw having a slot that opens outwardly away from the central axis; an adjuster including an annular flange that projects inwardly with respect to the central axis and is slidably received within the jaw slots; mating helical surfaces that support the adjuster on the driver for axial adjusting rotation that moves the jaws axially and concomitantly inwardly and outwardly along the inner and outer slideway surfaces for size adjustment between open and closed positions; and the annular flange being located along the axial extend of the slideways of the driver with the jaws in the closed position and the entire extend of each jaw being located radially inward of the radial outer extremity of the associated slideway with the jaws in the closed position.

18. An adjustable socket comprising: a driver that is rotatively driven about a central axis thereof; said driver having a plurality of inclined slideways each of which has inner and outer slideway surfaces extending parallel to each other with both radial and axial components with respect to the central axis; a plurality of jaws each of which has inner and outer parallel jaw surfaces; said jaws being respectively mounted by slidable engagement of the inner and outer parallel surfaces thereof with the inner and outer parallel slideway surfaces of the slideways of the driver for inward and outward movement along with concomitant axial movement with respect to the central axis; each jaw having a slot that opens outwardly away from the central axis; an adjuster including an annular flange that projects inwardly with respect to the central axis and is slidably received within the jaw slots; mating helical surfaces that support the adjuster on the driver for axial adjusting rotation that moves the jaws axially and concomitantly inwardly and outwardly along the innr and outer slideway surfaces for size adjustment between open and closed positions; and the annular flange being located along the axial extent of the slideways of the driver throughout jaw movement between the open and closed positions, and the entire extent of each jaw being located radially inward of the radial outer extremity of the associated slideway with the jaws in the closed position.

19. An adjustable socket comprising: a driver that is rotatively driven about a central axis thereof; said driver having a plurality of inclined slideways each of which has inner and outer slideway surfaces extending parallel to each other with both radial and axial components with respect to the central axis; a plurality of jaws each of which has inner and outer parallel jaw surfaces; said jaws being respectively mounted by slidable engagement of the inner and outer parallel surfaces thereof with the inner and outer parallel slideway surfaces of the slideways of the driver for inward and outward movement along with concomitant axial movement with respect to the central axis; each jaw having a slot that opens outwardly away from the central axis; an adjuster including an annular flange that projects inwardly with respect to the central axis and is slidably received within the jaw slots; mating helical surfaces that support the adjuster on the driver for axial adjusting rotation that moves the jaws axially and concomitantly inwardly and outwardly along the inner and outer slideway surfaces for size adjustment between open and closed positions; and the entire extent of each jaw being located radially inward of the radial outer extremity of the associated slideway with the jaws in the closed position.

* * * * *

UNITED STATES PATENT AND TRADEMARK OFFICE
CERTIFICATE OF CORRECTION

PATENT NO. : 4,608,887
DATED : September 2, 1986
INVENTOR(S) : David S. Colvin

It is certified that error appears in the above-identified patent and that said Letters Patent is hereby corrected as shown below:

Column 5, line 23, after "member" insert -- 34

Column 8, line 21, "extend" should read -- extent --.

Column 8, line 45, "extend" should read -- extent --.

Column 9, line 59, "cental" should read -- central --.

Column 10, line 33, "movemnt" should read -- movement --.

Column 11, line 9, "extend" should read -- extent --.

Column 11, line 34, "extend" should read -- extent --.

Column 11, line 36, "extend" should read -- extent --.

Column 12, line 12, "innr" should read -- inner --.

Signed and Sealed this

Third Day of February, 1987

Attest:

DONALD J. QUIGG

Attesting Officer     Commissioner of Patents and Trademarks